US010317274B2

(12) United States Patent
Beber et al.

(10) Patent No.: US 10,317,274 B2
(45) Date of Patent: Jun. 11, 2019

(54) COFFEE GRINDER WITH INTEGRATED SCALE (71) Applicant: Whirlpool Corporation, Benton Harbor, MI (US)

(72) Inventors: Kevin Beber, Granger, IN (US); Daniel Rellis, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 774 days.

(21) Appl. No.: 14/944,679

(22) Filed: Nov. 18, 2015

(65) Prior Publication Data
US 2017/0138782 A1 May 18, 2017

(51) Int. Cl.
A47J 42/38 (2006.01)
A47J 42/40 (2006.01)
G01G 19/52 (2006.01)

(52) U.S. Cl.
CPC .............. *G01G 19/52* (2013.01); *A47J 42/38* (2013.01); *A47J 42/40* (2013.01)

(58) Field of Classification Search
None
See application file for complete search history.

(56) References Cited

U.S. PATENT DOCUMENTS

| 1,608,718 | A | 11/1926 | Boyle et al. | |
| 4,800,973 | A | 1/1989 | Angel | |
| 5,329,069 | A * | 7/1994 | Amsel | A47J 43/046 177/132 |
| 5,462,236 | A | 10/1995 | Knepler | |
| 5,522,556 | A | 6/1996 | Knepler et al. | |
| 5,603,458 | A | 2/1997 | Sandolo | |
| 5,632,449 | A | 5/1997 | Sandolo | |
| 5,690,283 | A | 11/1997 | Sandolo | |
| 5,717,166 | A | 2/1998 | Talmadge | |
| 6,349,889 | B1 | 2/2002 | Sandolo | |
| 6,402,363 | B1 | 6/2002 | Maguire | |
| 6,783,089 | B2 * | 8/2004 | Lassota | A47J 31/42 241/30 |

(Continued)

FOREIGN PATENT DOCUMENTS

EP 2666397 A1 11/2013
WO 0123095 A1 4/2001

(Continued)

*Primary Examiner* — Shelley M Self
*Assistant Examiner* — Jared O Brown
(74) *Attorney, Agent, or Firm* — Price Heneveld LLP (57) ABSTRACT A coffee grinder apparatus includes a housing with a support base, a pedestal portion, and a motor housing extending outwardly from the pedestal portion above the support base to define a jar receiving area. A motor is disposed in the motor housing and is operably coupled to a grinder assembly. A hopper is operably coupled to an upper mounting portion of the motor housing disposed above the grinder assembly. The hopper includes a cavity configured to hold coffee beans with an open base portion opening into the grinder assembly. A collection jar is configured for reception in the jar receiving area and includes a vessel defining a cavity for collecting ground coffee expelled from the grinder assembly during a grinding procedure. An integrated scale assembly is disposed in the collection jar for weighing the ground coffee as received in the collection jar.

13 Claims, 5 Drawing Sheets (56) References Cited

U.S. PATENT DOCUMENTS

| | | | |
|---|---|---|---|
| 8,127,605 B2 * | 3/2012 | Kolada | G01F 19/00 |
| | | | 73/426 |
| 8,371,211 B2 | 2/2013 | Nosler et al. | |
| 2007/0257142 A1 | 11/2007 | Chapman | |
| 2010/0089152 A1 | 4/2010 | Kolada et al. | |
| 2014/0123857 A1 | 5/2014 | Rego | |
| 2014/0203118 A1 | 7/2014 | Rego | |
| 2014/0263780 A1 | 9/2014 | Day, Jr. | |
| 2015/0136496 A1 | 5/2015 | Rego | |
| 2016/0374513 A1 * | 12/2016 | Rego | A47J 42/40 |
| | | | 99/280 |

FOREIGN PATENT DOCUMENTS

| | | |
|---|---|---|
| WO | 2010131242 A1 | 11/2010 |
| WO | 2015089567 A1 | 6/2015 |

* cited by examiner

COFFEE GRINDER WITH INTEGRATED SCALE

BACKGROUND

The present concept generally related to a coffee grinder apparatus and, more particularly, to a coffee grinder apparatus having a collection jar with an integrated scale.

SUMMARY

One aspect of the present concept includes a coffee grinder apparatus having a housing with a support base, a pedestal portion extending upwardly from the support base, and a motor housing extending outwardly from the pedestal portion above the support base to define a jar receiving area therebetween. A motor is disposed in the motor housing and is operably coupled to a grinder assembly for powering the same. A hopper is operably coupled to an upper mounting portion of the motor housing disposed above the grinder assembly. The hopper assembly includes a cavity configured to hold coffee beans. The cavity includes an open base portion which opens into the grinder assembly. A collection jar is configured for reception in the jar receiving area and includes a vessel which defines a cavity for collecting ground coffee expelled from the grinder assembly during a grinding procedure. A scale assembly is included in the collection jar for weighing the ground coffee received in the vessel of the collection jar.

Another aspect of the present concept includes a coffee grinder apparatus having a housing which includes a support base spaced-apart from a motor housing that is interconnected by a pedestal portion to define a jar receiving area therebetween. A motor is disposed in the motor housing and a grinder assembly is operably coupled to the motor for powering the same. A hopper is operably coupled to an inlet of the motor housing which is disposed above the grinder assembly. The hopper is configured to hold coffee beans for grinding during a grinding procedure. A collection jar is configured for lateral reception in the jar receiving area and includes a base portion operably coupled to a vessel body, wherein the vessel body is configured to collect ground coffee from the grinder assembly during the grinding procedure. An integrated scale assembly is configured for weighing an amount of ground coffee received in the vessel body of the collection jar. A digital display is disposed in the base portion of the collection jar and is operably coupled to the integrated scale assembly. The digital display is configured to display a weight of the amount of ground coffee received in the vessel body of the collection jar.

Yet, another aspect of the present concept includes a method of using a coffee grinding apparatus having an integrated scale assembly. The method includes the steps of: 1) placing coffee beans in a vessel of a hopper mounted to an inlet of a motor housing, wherein the inlet opens into a grinder assembly of the coffee grinding apparatus; 2) removably mounting a collection jar on a support pad of the coffee grinding apparatus disposed below an outlet of the motor housing; 3) grinding the coffee beans from the vessel of the hopper using a motor configured to power the grinder assembly; 4) depositing an amount of ground coffee into a vessel of the collection jar; 5) weighing the amount of ground coffee using a digital measuring device integrated into a base portion of the collection jar, the digital measuring device including: one or more weight sensors operably coupled to a bottom wall of the vessel of the collection jar; a power source operably coupled to the one or more weight sensors; a digital interface operably coupled to the one or more weight sensors and further coupled to a digital display; 6) sensing a weight of the amount of ground coffee using the one or more weight sensors; 7) sending weight information via an electric signal from the one or more weight sensors to the digital interface; 8) processing the electric signal using the digital interface; and 9) displaying a measured weight of the amount of ground coffee on the digital display screen as received via a signal from the digital interface.

These and other features, advantages, and objects of the present device will be further understood and appreciated by those skilled in the art upon studying the following specification, claims, and appended drawings.

DETAILED DESCRIPTION OF EMBODIMENTS

Figure 1:
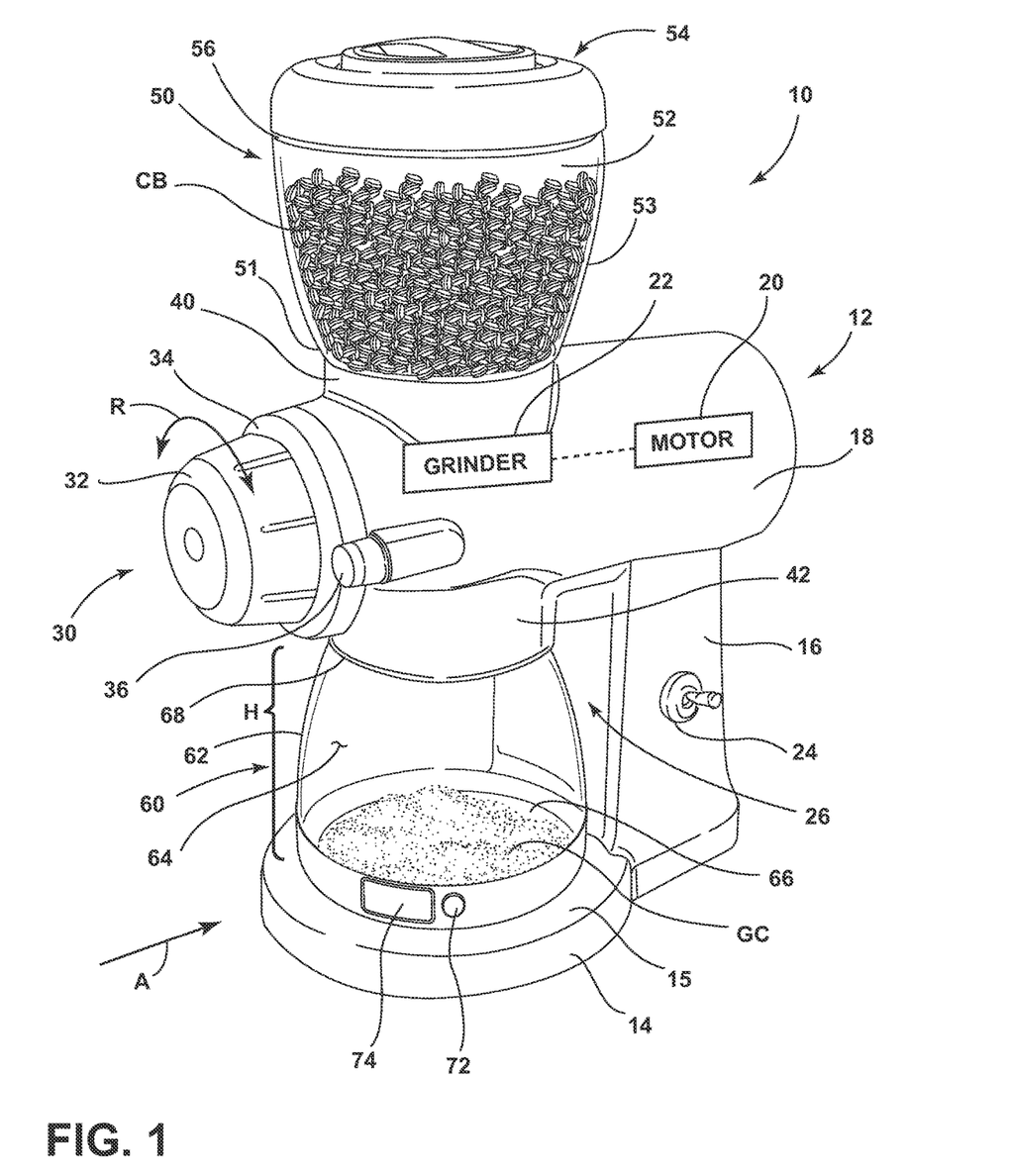
FIG. 1 is a front perspective view of a coffee grinder apparatus according to one embodiment.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a coffee grinder apparatus 10 is shown having a body portion 12 which includes a support base 14, a pedestal portion 16 which extends upwardly from the support base 14, and a motor housing 18 which is supported by the pedestal portion 16 and extends over the support base 14 to define a jar receiving area therebetween. The motor housing 18 is configured to house a motor 20 which is operably coupled with a grinder assembly 22. The grinder assembly 22 is contemplated to be a burr grinder having metal burr grinding elements configured to grind coffee beans as powered by the motor 20. A power switch 24 is disposed on the pedestal portion 16 of the coffee grinder apparatus 10 and is configured to selectively provide power to the motor for powering a grinding sequence of the coffee grinder apparatus 10. The coffee grinder apparatus 10 is contemplated to include a power cord for plugging into a household receptacle. The body portion 12 further includes a user interface 30 disposed on a front end of the motor housing 18 which includes a rotary dial 32 disposed adjacent a stationary bezel 34. The rotary dial 32 is configured for rotation along a path as indicated by arrow R to select a grind setting which typically will include markings disposed on the bezel 34 for selection by a user. It is contemplated that rotation of the rotary dial 32 provides for various settings between the burr grinding elements to provide ground coffee (GC) suitable for various brewing techniques, such as French press, siphon, pour over, espresso, and other like settings. The bezel 34 is coupled to the motor housing 18 via fasteners 36 which can be removed for accessing a driveshaft and other components of the grinder assembly 22.

As further shown in FIG. 1, the coffee grinding apparatus 10 further includes an upper mounting portion 40 disposed on the motor housing 18, and a lower outlet portion 42 disposed below and aligned with the upper mounting portion 40 and the grinder assembly 22. As further shown in FIG. 1, an upper vessel or hopper jar 50 is configured to mount to the upper mounting portion 40 at an open base portion 51. The hopper 50 includes a vessel body portion 53 which defines a cavity 52 configured to hold coffee beans CB for grinding by the coffee grinder apparatus 10. The hopper 50 essentially defines a coffee bean hopper for the coffee grinder apparatus 10 and includes a lid 54 for coupling to an open top portion 56 of the hopper 50 to seal the cavity 52. The upper mounting portion 40 defines an inlet through which coffee beans CB pass through from the open base portion 51 of the hopper 50 to the grinder assembly 22.

As further shown in FIG. 1, the coffee grinder apparatus 10 further includes a lower vessel or collection jar 60 having a vessel body portion 62 which generally defines a cavity 64 for collecting ground coffee GC as ground and expelled by the grinder assembly 22 through outlet 42 during a grinding procedure. The vessel body 62 includes a bottom wall 66 having an upper surface 66a (FIG. 2) on which the ground coffee GC is generally deposited during a coffee grinding event as received from the lower outlet 42 through an open top 68 of the vessel body 62. The collection jar 60 further includes a base portion 70 having a user interface 72 as well as a digital display 74. The user interface 72 is shown in the form of a push button feature which may be used to turn on and off an integrated scale assembly 80 (FIG. 5) disposed in the base portion 70, as further described below, or to change various scale display settings. The digital display 74 is contemplated to be an electronic display, such as an LCD screen assembly, used to display a measured weight of ground coffee GC received in the cavity 64 of the collection jar 60. It is contemplated that the display 74 can toggle between grams "g" and ounces "Oz", or other units of measure, as selected by the user using the user interface 72. The user interface 72 can also be used to clear the scale assembly 80 for a zero reading or tare the scale assembly 80 for beginning a new weighing procedure in the collection jar 60.

As further shown in FIG. 1, the collection jar 60 is laterally received in the jar receiving area 26 in a direction as indicated by arrow A. As noted above, the jar receiving area 26 is defined between the motor housing 18, and specifically the lower outlet 42 thereof, and a support surface 15 of the support base 14 on which the collection jar 60 is supported and received. As shown in FIG. 1, the collection jar 60 has a combined height H of the vessel body 62 and base portion 70, such that the open top 68 is disposed directly adjacent to the lower outlet 42 of the housing 12. In this way, the collection jar 60 is configured to receive the ground coffee GC during a grinding sequence in such a manner as to avoid ground coffee missing the collection jar 60 during the sequence.

Figure 2:
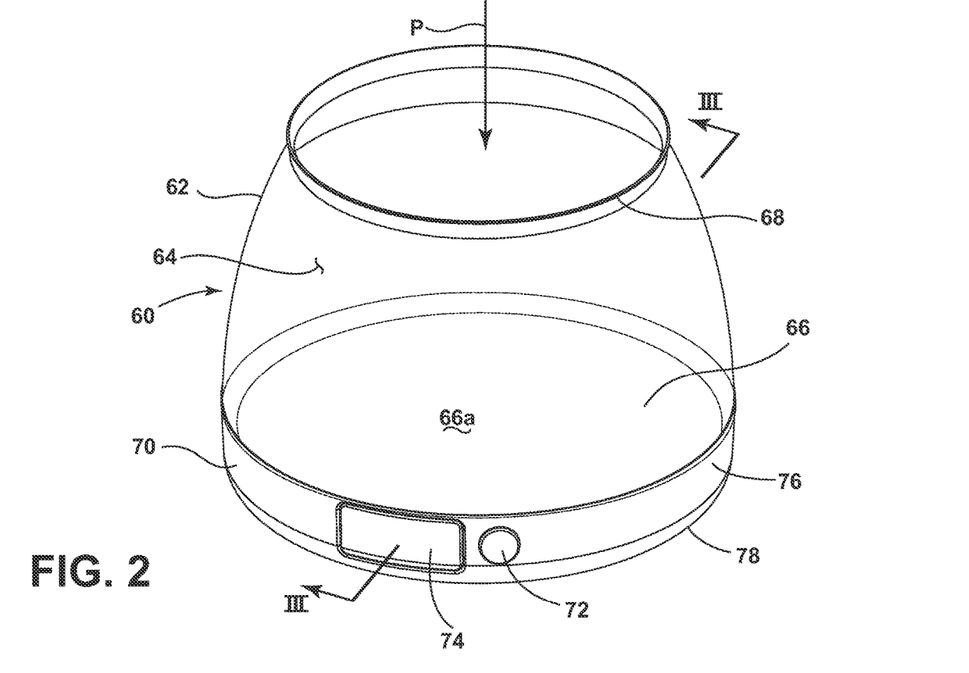
FIG. 2 is a top perspective view of a collection jar of the coffee grinder apparatus.

Referring now to FIG. 2, the collection jar 60 is shown with the open top 68 configured to receive ground coffee GC (FIG. 1) therethrough along the path as indicated by arrow P. As noted above, the ground coffee GC (FIG. 1) is generally received on an upper surface 66a of the bottom wall 66 of the cavity 64 of the collection jar 60 for weighing using an integrated scale 80 (FIG. 5) as further described below. As further shown in FIG. 2, the base portion 70 includes an upper collar 76 and a bottom cover 78 which are coupled together to define a general structure of the base portion 70 in which the integrated scale assembly 80 is disposed.

Figure 3:
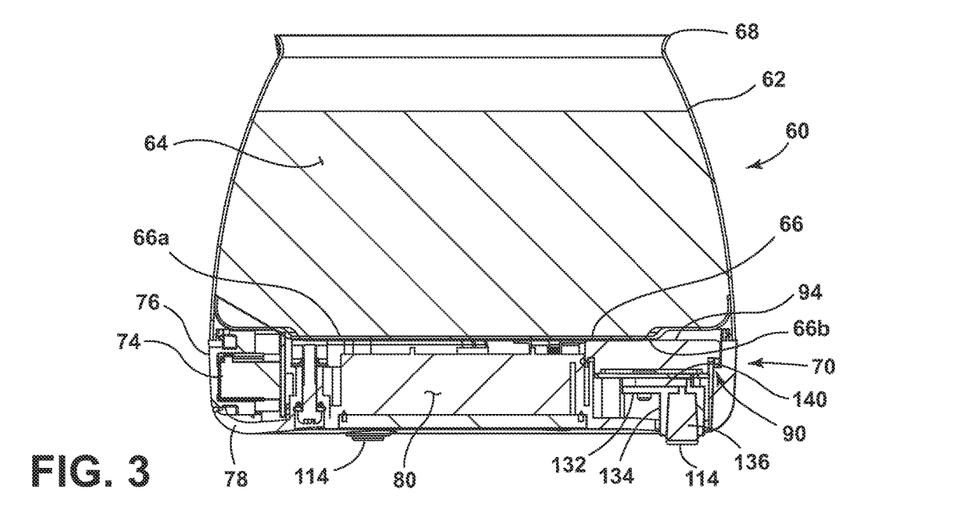
FIG. 3 is a cross-sectional view of the collection jar of FIG. 2 taken at line III.

Referring now to FIG. 3, the collection jar 60 is shown in a cross-sectional view with components of an integrated scale assembly 80 shown disposed in the base portion 70. The integrated scale 80 is operably coupled to the vessel body 62 of the collection jar 60 at a lower surface 66b of the bottom wall 66 for weighing the contents of the cavity 64 of the collection jar 60, as further described below.

Figure 4:
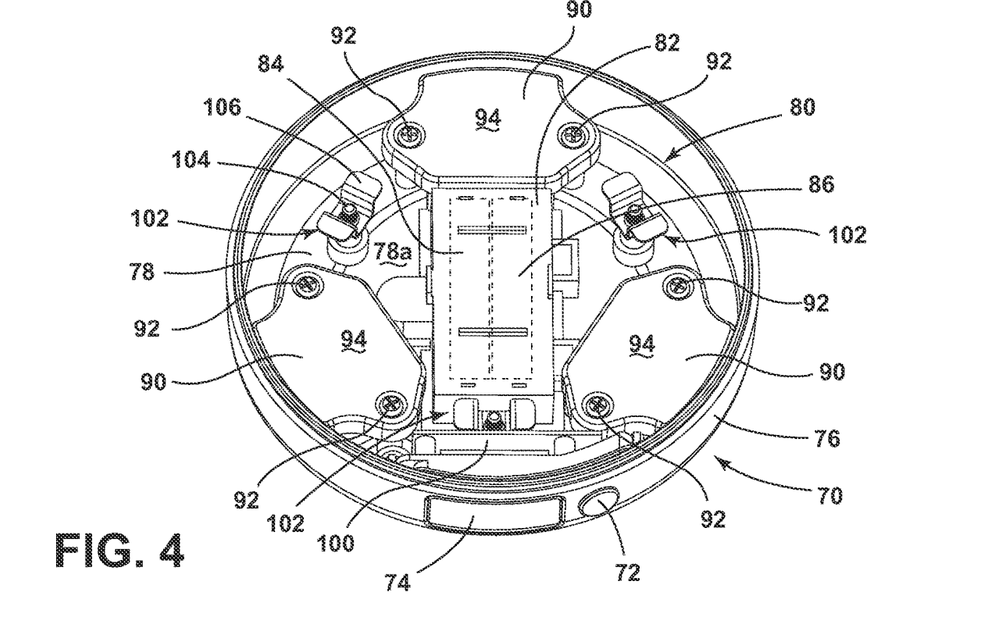
FIG. 4 is a top perspective view of a base portion of the collection jar of FIG. 2 with a vessel portion removed therefrom to reveal an integrated scale assembly.
Figure 7:
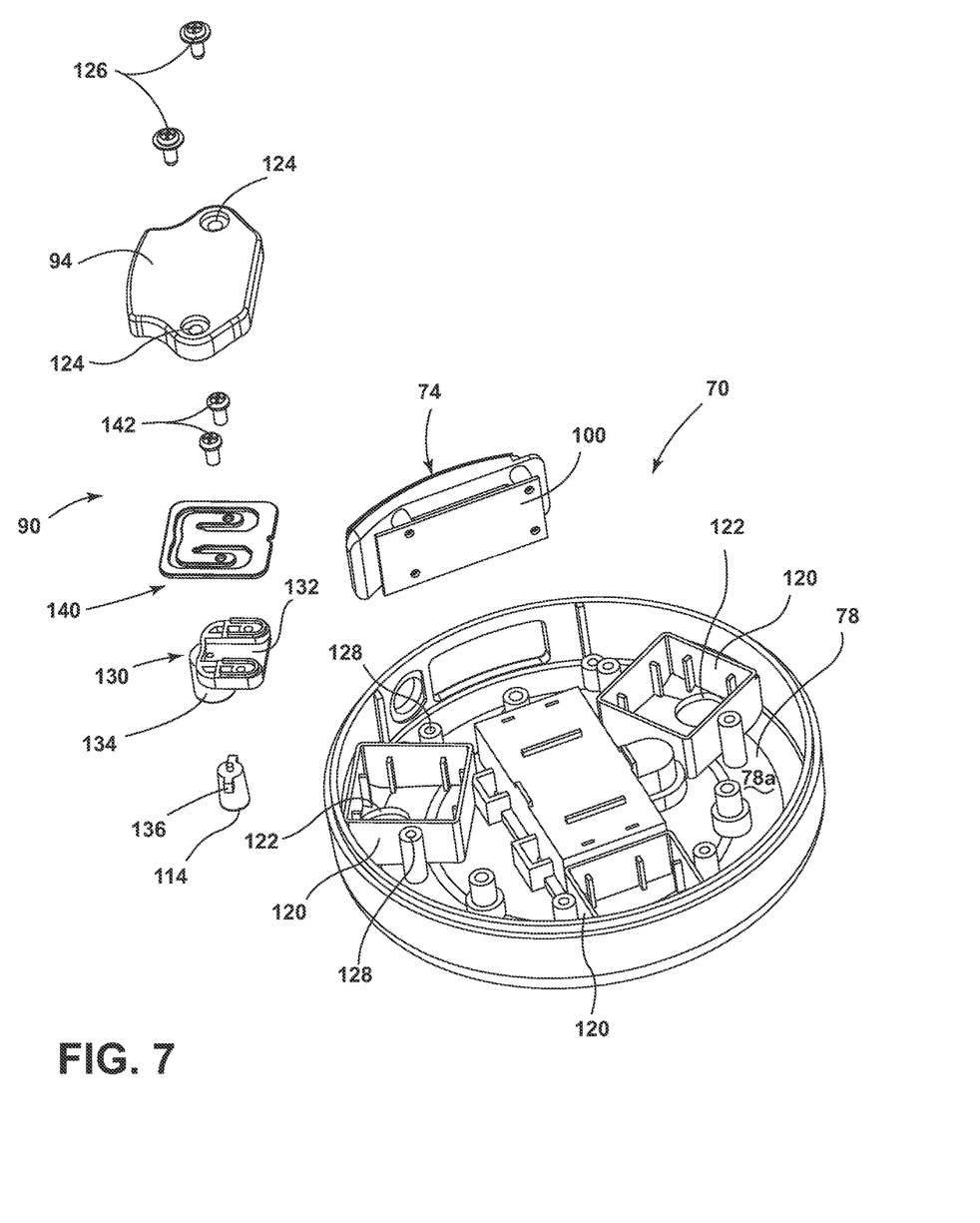
FIG. 7 is an exploded view of a weight sensor of the integrated scale assembly.

Referring now to FIG. 4, the integrated scale assembly 80, or digital measuring device, is shown entirely disposed within the base portion 70 of the collection jar 60 and includes a battery cover 82 for housing first and second batteries 84, 86 which define a power source (separate from the contemplated power cord) used to power the integrated scale assembly 80. The first and second batteries 84, 86 are contemplated to be AA or AAA size batteries, however, it is contemplated that any number of batteries or battery size sufficient to power the integrated scale assembly 80 may be used with the present concept. The batteries 84, 86 are operably and electrically coupled to individual weight sensors 90 which are operably coupled to the bottom cover 78 of the base portion 70 via fasteners 92. The weight sensors 90 define a plurality of weight sensors or a sensor array disposed in the base portion 70. The weight sensors 90 include upper contact pads 94 which are generally planar surfaces configured to abut the lower surface 66b of the bottom wall 66 of the collection jar 60, as best shown in FIG. 3. The weight sensors 90 are contemplated to be subminiature resistive load cells having the accuracy necessary to precisely measure an amount of ground coffee received in the collection jar 60. The weight sensors 90 can be any type of weighing sensor such as strain gauges, transducers, load cells, or pressure sensors, and are not meant to limit the scope of the present concept to any one type of sensor. The weight sensors 90 are contemplated to be used in a compression force measurement application for measuring the ground coffee received in the cavity 64 of the collection jar 60. Thus, as ground coffee is received in the cavity 64 of the collection jar 60, the weight of the ground coffee is transferred to the weight sensors 90 for measurement thereof. The weight sensors 90 are operably and electrically coupled to a digital interface 100 which is configured to send display commands to the display 74 for displaying a measured weight of ground coffee received from the weight sensors 90 in use. The digital interface 100 is contemplated to be a micro-chip, printed circuit board (PCB), or other like digital processor capable of taking load information in the form of electric signals sent from the separate weight sensors 90 and processing the signal information for display on the digital display 74 of the base portion 70. The digital interface 100 is contemplated to be a PCB which is best shown in the embodiment of FIG. 7. The user interface button 72 is also operably coupled to the digital interface 100 for use in taring or zeroing the scale 80, as well as providing other features selected by a user, such as a change in measuring units. It is contemplated that any number of weight sensors 90 can be used in conjunction with the present concept, and as coffee grounds are randomly compiled in the cavity 64 of the collection jar 60, multiple weight sensors 90 are shown for use with the present concept in FIG. 4 for calculating a measured weight using a number of various weight inputs from the different weight sensors 90.

Figure 5:
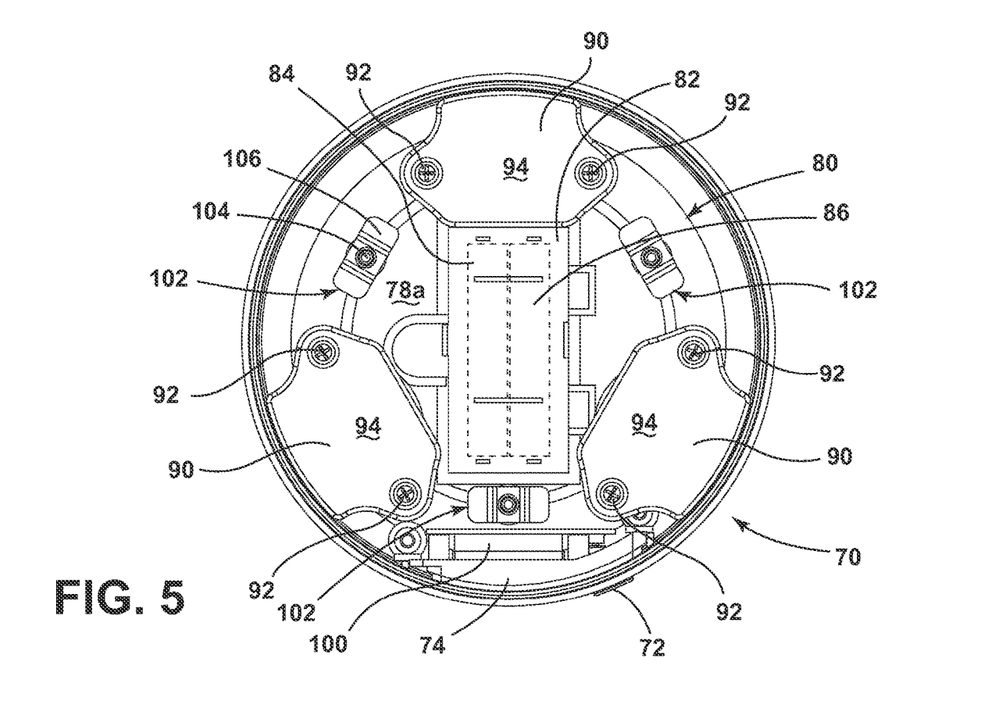
FIG. 5 is a top plan view of the base portion and integrated scale assembly of FIG. 4.

As shown in FIGS. 4 and 5, the base portion 70 of the collection jar 60 further includes upstanding support members 102 which upwardly extend from an upper surface 78a of the bottom cover 78 of the base portion 70 via fasteners 104. The upstanding support members 102 further include U-shaped arm features 106 which are flexibly resilient and configured to protect the integrated scale assembly 80 from an overload situation. Specifically, the upstanding support members 102 are configured to abut the lower surface 66b of the bottom wall 66 of the vessel body 62 in an overload situation to protect the weight sensors 90 from damage.

Figure 6:
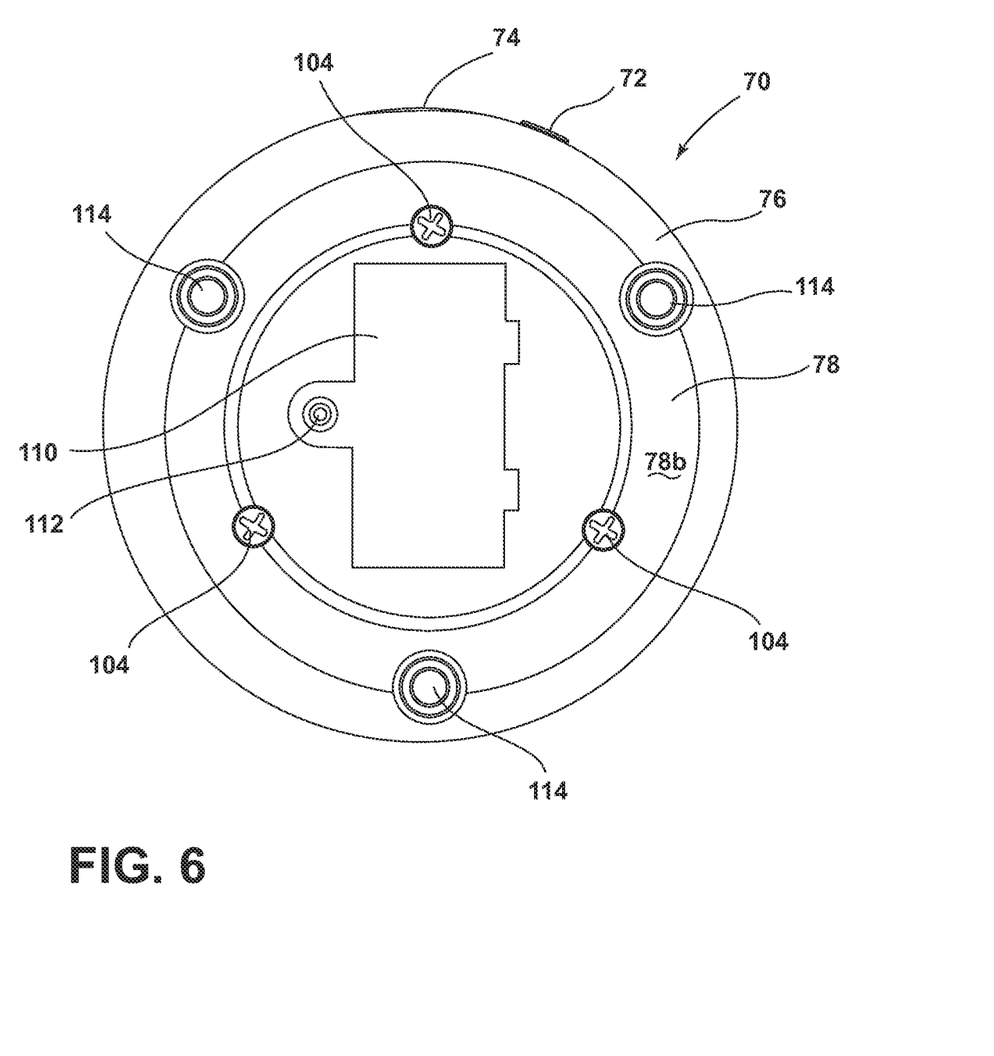
FIG. 6 is a bottom plan view of the base portion of FIG. 5.

Referring now to FIG. 6, the lower surface 78b of the bottom cover 78 of the base portion 70 is shown with fasteners 104 accessible therefrom. The bottom cover 78 further includes a removable or opening battery cover 110 having a locking feature 112 for providing access to and for closing the battery housing 82 shown in FIGS. 4 and 5. A plurality of feet 114 are disposed on and downwardly extend through the bottom cover 78. The feet 114 are configured to support the weight sensors 90 which ultimately weigh and support the collection jar 60 on a support surface, such as support surface 15 of the coffee grinder apparatus 10 shown in FIG. 1. The support feet 114 may include a rubberized feature for providing extra grip for the collection jar 60 as supported on a support surface.

Referring now to FIG. 7, the base portion 70 is shown with the display 74 and the digital interface 100 coupled together and exploded away from the base portion 70. As further shown in FIG. 7, a weight sensor 90 is shown in an exploded form away from the base portion 70. The base portion 70 includes a plurality of compartments 120 which extend upwardly from the upper surface 78a of the bottom cover 78. A receiving aperture 122 is disposed through the bottom cover 78 within the confines of each of the compartments 120. Each compartment 120 is configured to receive a weight sensor 90, as best shown in FIGS. 4 and 5. The weight sensor 90 of FIG. 7 includes the upper contact pad 94 having mounting apertures 124 which are configured to receive fasteners 126 therethrough for mounting to mounting bosses 128 which upwardly extend from the upper surface 78a of the bottom cover 78. The weight sensor 90 further includes a base support member 130 having a support platform 132 and a base sleeve portion 134. The base sleeve portion 134 extends downwardly from the support platform 132 and is configured to at least partially receive a support column 136 therein. The support column 136 includes a foot 114 disposed on a lower portion thereof for supporting the weight sensor 90 as described above. The weight sensor 90 further includes a beam 140 which is configured to couple to the support platform 132 of the base support member 130 via fasteners 142. The beam 140 is a deformable member configured to flex or deform as coffee grounds are added to the collection jar 60 such that a change in resistance and voltage output can be measured by the weight sensor 90 for processing by the digital interface 100. In this way, the vessel body 62 of the collection jar 60 floats on the weight sensors 90 to a very minimal extent such that the contents of the cavity 64 defined by the vessel body 62 can be weighed by the weight sensors 90 as coupled thereto.

With further reference to FIG. 3, the weight sensor 90 is shown having the support column 136 extending through the bottom cover 78 with foot 114 disposed thereon for supporting the weight sensor 90 through the base portion 70. As noted above, the weight sensor 90 further supports the vessel body 62 at a lower surface 66b of the bottom wall 66 of the vessel body 62 in a way that the weight sensor 90 can weigh the contents of the cavity 64 of the vessel body 62.

A method of using the coffee grinding apparatus 10 is also disclosed herein, wherein the method includes the steps of: 1) taring the digital measuring device integrated scale assembly 80 using the user interface 72. 2) Placing coffee beans CB (FIG. 1) in the vessel 53 of the bean hopper 50 mounted to the inlet 40 of the motor housing 18, wherein the inlet 40 opens into the grinder assembly 22 of the coffee grinding apparatus 10. 3) Removably mounting the collection jar 60 on a support surface 15 of the coffee grinding apparatus 10 disposed below the outlet 42 of the motor housing 18. 4) Grinding the coffee beans CB from the vessel 53 of the hopper 50 using the motor 20 configured to power the grinder assembly 22. 5) Depositing an amount of ground coffee GC into the vessel 62 of the collection jar 60. 6) Weighing the amount of ground coffee GC (FIG. 1) using the digital measuring device 80 integrated into the base portion 70 of the collection jar 60. 7) Sensing a weight of the amount of ground coffee GC using one or more weight sensors 90. 8) Sending weight information via an electric signal from the one or more weight sensors 90 to the digital interface 100. 9) Processing the electric signal using the digital interface 100. 10) Displaying the measured weight of the amount of ground coffee GC on the digital display 74 as received via a signal from the digital interface 100 to the digital display 74.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A coffee grinder apparatus, comprising:
   a housing including a support base, a pedestal portion extending upwardly from the support base, and a motor housing extending outwardly from the pedestal portion and above the support base to define a jar receiving area therebetween;
   a motor disposed in the motor housing, the motor operably coupled to a grinder assembly for powering the same;
   a hopper operably coupled to an upper mounting portion of the motor housing disposed above the grinder assembly, the hopper having a cavity configured to hold coffee beans, wherein the cavity includes an open base portion which opens into the grinder assembly;
   a collection jar configured for reception in the jar receiving area, the collection jar including a base portion and a vessel operably coupled to the base portion, wherein the vessel defines a cavity for collecting ground coffee expelled from the grinder assembly during a grinding procedure; and
   a scale assembly having a plurality of weight sensors disposed within the base portion of the collection jar for weighing the ground coffee received in the vessel of the collection jar, wherein each weight sensor of the plurality of weight sensors includes an upper contact pad configured to abut a lower surface of a bottom wall of the vessel of the collection jar, and further wherein each weight sensor of the plurality of weight sensors includes a deformable beam coupled to a base support member having a support platform and a base sleeve portion extending downwardly from the support platform, and further wherein each weight sensor of the plurality of weight sensors includes a support column at least partially received in the base sleeve portion of the base support member.

2. The coffee grinder apparatus according to claim 1, wherein the scale assembly includes a digital interface operably coupled to the plurality of weight sensors, the digital interface configured to process electric signals sent from one or more of the weight sensors of the plurality of weight sensors.

3. The coffee grinder apparatus according to claim 2, including:
   a digital display operably coupled to the digital interface, the digital display configured to display a weight of the ground coffee received in the collection jar.

4. The coffee grinder apparatus according to claim 3, including:
   a user interface operably coupled to the digital interface, the user interface configured to tare the scale assembly.

5. The coffee grinder apparatus according to claim 4, wherein the user interface is further configured to toggle the scale assembly between different units of measure.

6. The coffee grinder apparatus according to claim 1, wherein the base support member includes a foot disposed on a lower portion thereof.

7. The coffee grinder apparatus according to claim 6, wherein each weight sensor of the plurality of weight sensors is received in a compartment disposed on a bottom cover of the base portion of the collection jar.

8. The coffee grinder apparatus according to claim 7, wherein the foot of the base support member extends outwardly through receiving apertures disposed through the bottom cover of the base portion of the collection jar within the compartment.

9. The coffee grinder apparatus according to claim 1, wherein the collection jar is configured for lateral reception in the jar receiving area.

10. A coffee grinder apparatus, comprising:
    a housing including a support base spaced-apart from a motor housing and interconnected by a pedestal portion to define a jar receiving area therebetween;
    a motor disposed in the motor housing,
    a grinder assembly operably coupled to the motor;
    a hopper operably coupled to an inlet of the motor housing disposed above the grinder assembly, the hopper configured to hold coffee beans for grinding in a grinding procedure;
    a collection jar configured for lateral reception in the jar receiving area, the collection jar including a base portion operably coupled to a vessel body, wherein the vessel body is configured to collect ground coffee from the grinder assembly during the grinding procedure, and further wherein the base portion of the collection jar includes a plurality of compartments extending upwardly from an upper surface of a bottom cover;
    an integrated scale assembly for weighing an amount of ground coffee received in the vessel body of the collection jar; and
    a digital display disposed in the base portion of the collection jar, the digital display operably coupled to the integrated scale assembly and configured to display a weight of the amount of ground coffee received in the vessel body of the collection jar.

11. The coffee grinder apparatus according to claim 10, wherein each compartment of the plurality of compartments includes a receiving aperture disposed through the bottom cover.

12. The coffee grinder apparatus according to claim 11, including:
- a weight sensor disposed in each compartment of the plurality of compartments, wherein each weight sensor includes an upper contact pad configured to abut a bottom wall of the vessel body at a first end, and further includes a support column extending through the receiving aperture to support the collection jar from a support surface.

13. The coffee grinder apparatus according to claim 12, including:
- one or more upstanding support members extending upwardly from the upper surface of the bottom cover and configured to abut the bottom wall of the vessel body in an overload situation.

* * * * *